United States Patent

Schiesterl et al.

[15] 3,703,704
[45] Nov. 21, 1972

[54] AUTOMOTIVE VEHICLE WARNING DEVICE WITH ALL POSITION IGNITION KEY CIRCUIT ACTUATION VIA STEERING LOCK

[72] Inventors: Gerhard Schiesterl, Stuttgart-Mohringen; Josef Eibl, Ingolstadt/Danube, both of Germany

[73] Assignee: Daimler-Benz Aktiengesellschaft, Stuttgart-Unterturkheim, Germany

[22] Filed: Feb. 13, 1970

[21] Appl. No.: 11,167

[30] Foreign Application Priority Data

Feb. 14, 1969 Germany..........P 19 07 390.6

[52] U.S. Cl. ..................340/64, 200/44, 200/61.66, 340/52 D
[51] Int. Cl........B60r 25/04, B60q 1/52, H01r 31/08
[58] Field of Search ....200/8, 42, 44, 61.66, 166 BH; 340/520, 274

[56] References Cited

UNITED STATES PATENTS

| | | | |
|---|---|---|---|
| 3,325,783 | 6/1967 | Webb | 340/52 D |
| 2,519,940 | 8/1950 | Smith et al. | 340/52 D |
| 2,847,656 | 8/1958 | Ricks | 340/52 D |
| 3,391,302 | 7/1968 | Weingarden | 340/52 D X |
| 3,317,904 | 5/1967 | Clay | 340/274 |
| 1,695,518 | 12/1928 | Watson | 200/44 UX |
| 1,714,426 | 5/1929 | Kuepfer | 200/44 UX |
| 2,057,301 | 10/1936 | Golokow et al. | 200/61.66 |
| 2,105,304 | 1/1938 | Wagner | 200/61.66 X |
| 2,123,507 | 7/1938 | Jacobi | 200/61.66 |
| 2,868,007 | 1/1959 | Neiman et al. | 200/44 X |
| 3,165,599 | 1/1965 | Clay | 200/44 |
| 3,219,768 | 11/1965 | Johnstone | 200/44 |
| 3,261,928 | 7/1966 | Schlesinger, Jr. | 200/8 |

*Primary Examiner*—J. R. Scott
*Attorney*—Craig and Antonelli

[57] ABSTRACT

A steering lock for a motor vehicle which includes a make-contact to actuate a warning installation when the ignition key is left inserted in the lock and a vehicle door is opened; the locking cylinder of the steering lock includes a mounting support made from insulating material which contains two opposite pins or spring-ring parts projecting into the path of the key but without contacting one another; the inner ends of the pins or spring-ring parts may be constructed ball-shaped, conical, or the like, and are in contact with their outer ends at a slip-ring that is connected with the warning installation.

9 Claims, 5 Drawing Figures

INVENTORS
GERHARD SCHIESTERL
JOSEF EIBL

BY
Craig, Antonelli, Stewart & Hill
ATTORNEYS

AUTOMOTIVE VEHICLE WARNING DEVICE WITH ALL POSITION IGNITION KEY CIRCUIT ACTUATION VIA STEERING LOCK

The present invention relates to a steering lock for motor vehicles with a contact-making means for the actuating of a warning installation with an inserted ignition key and an opened vehicle door. Such warning installations serve as precaution to prevent thefts, misuse by children, accidents with turned-on ignition, etc.

It is known for the prevention of thefts to build into motor vehicles acoustic or optical warning installations which become operable, for example, as hooting signal or by turning the headlights on and off, if a vehicle door is opened. These prior art warning installations entail the disadvantage that they have to be switched into operating readiness by the driver upon leaving the vehicle, i.e., are not always ready for use because the driver, when leaving the vehicle for a short period of time, will hardly always turn on the safety device. On the other hand, the known warning installation will always go into action when the driver himself enters the vehicle and prior thereto has forgotten to turn off the warning installation. Further disadvantages of these prior art installations reside in the fact that the warning installations require a large technical expenditure and operate independently of whether or not the ignition key is inserted into the steering lock.

The present invention is predicated on the aim to warn the driver upon leaving every time by a continuous or timely interrupted warning signal when he has left the ignition key in the steering lock and consequently has not secured the vehicle against unauthorized use.

The underlying problems are solved by the present invention in that the lock cylinder of the steering lock is provided with a mounting support made from insulating, synthetic resinous material of any known type which contains two oppositely disposed pins or spring-ring parts projecting into the key passage but not contacting with one another, which are constructed at the inner ends thereof ball-shaped, conical or the like and which with the outer ends thereof are operatively connected elastically with a slip ring that is connected by way of a contact cable or any other conductor with the warning installation. The ball-like or conical configuration of the ends of the pins or spring-ring parts projecting into the key path serves the purpose to enable conveniently the insertion of the ignition key into the key channel whereby the pins or spring-ring parts are pressed outwardly so that a good contact between the two pins or the two spring-ring parts and the ground results. The current circuit to the slip ring and therewith to the warning installation is then closed with an opened door.

The slip ring is appropriately embedded in an insulating ring within the outer cover cap.

The synthetic resinous mounting support may be so constructed that it may be assembled or emplaced on the lock cylinder, for example, by means of two recesses in the lock cylinder and corresponding pins.

In order to prevent that the pins or spring-ring parts are pressed too far into the key path and thereby impair the insertion of the ignition key, the pins or spring-ring parts may be provided with abutments which limit the movements of these parts inwardly toward the key path.

According to one embodiment a flat spring may be provided which forces the two oppositely disposed pins into the key path and is so constructed at the ends thereof that it establishes a contact with the slip ring. The flat spring thereby appropriately encloses ring-shaped the synthetic resinous mounting support. The two ends of the flat spring are advantageously separated by an entrainment abutment of the plastic mounting support which takes along the flat spring during rotation of the key. It is achieved thereby that the flat spring cannot displace itself in relation to the pins whereby otherwise the contact, for example, at the ends of the spring between the pins and the spring might be lost.

The pins may also be constructed as telescopic pins whose parts mutually guided one within the other are forced apart by springs disposed on the inside thereof and whose inner pin parts are pressed against the slip ring. The outer pin parts may be provided at the outer end with a flanged or beaded edge.

According to a further embodiment of the present invention, spring-ring parts may be provided in the place of the pins which project into the key path and form part of a ring, at the circumference of which are provided wiper or slide springs which establish a contact with the slip ring.

Accordingly, it is an object of the present invention to provide a steering lock for motor vehicles which avoids by simple means the aforementioned shortcomings and drawbacks encountered in the prior art.

Another object of the present invention resides in a steering lock for motor vehicles which is ready for operation at all times without requiring any action on the part of the driver when leaving the vehicle.

A further object of the present invention resides in a steering lock for motor vehicles which is simple in construction, easy to assemble and involves only parts that can be readily manufactured.

Still a further object of the present invention resides in a steering lock which operates in dependence on whether or not the ignition key is inserted into the steering lock.

Still another object of the present invention resides in a steering lock which permits a compact construction, allowing also installation thereof into existing steering locks.

These and other objects, features, and advantages of the present invention will become more obvious from the following description when taken in connection with the accompanying drawing which shows, for purposes of illustration only, several embodiments in accordance with the present invention, and wherein.

Figure 1:
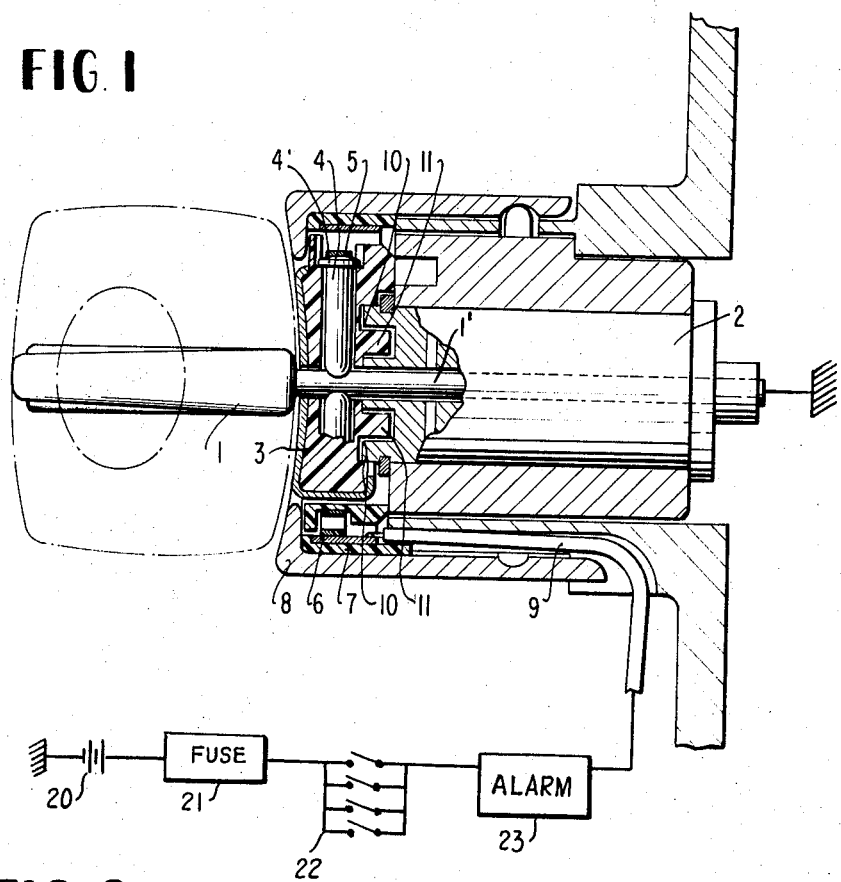
FIG. 1 is a longitudinal cross-sectional view through a first embodiment of a steering lock in accordance with the present invention with two simple pins.

Referring now to the drawing wherein like reference numerals are used throughout the various views to designate like parts, reference numeral 1 indicates in all figures the ignition key which is inserted into the key channel of the lock cylinder 2 consisting of the external stator and the internal rotor. Since the lock cylinder is of conventional construction, a detailed showing and description thereof is dispensed with herein.

Figure 2:
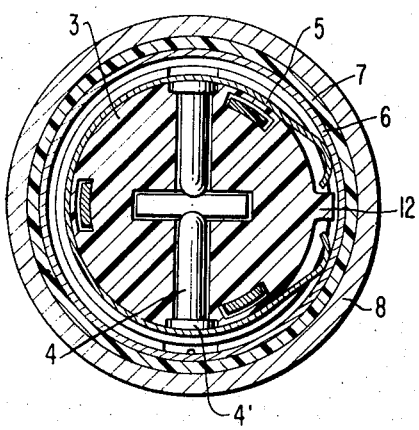
FIG. 2 is a transverse, cross-sectional view through the steering lock according to FIG. 1.

In the embodiment according to FIGS. 1 and 2, the pins 4 guided in this embodiment in a mounting support 3 of synthetic resinous material are forced outwardly against the spring force of the flat spring 5 so that the pins 4 abut against the key 1 with slight pressure and thereby establish a good contact. In FIG. 1, however, the pins 4 are illustrated in their innermost position, i.e., in the position in which the ignition key has been completely removed or pulled out. The pins 4 include abutments 4' which limit the movement of the pins 4 inwardly toward the key passage. As can be seen in particular from FIG. 2, the flat spring 5 which may be constructed either in one piece or also two-partite corresponding to the number of the pins, slides with its ends on the slip-ring 6 that is embedded in an insulating ring 7 disposed in the outer cover cap 8 and is connected by way of a contact cable 9 (FIG. 1), with the warning installation, for example, with a conventional buzzer. The plastic mounting support 3 is assembled in the embodiment of FIGS. 1 and 2 on the lock cylinder 2 by means of two recesses 10 in the lock cylinder and corresponding pins 11. An entrainment abutment 12 provided at the plastic mounting support 3 effects that the flat spring 5 is taken along during rotation of the key 1.

The current supply in the illustrated embodiment with an inserted ignition key and an open door is as follows:

Current source 20 fuse box 21 — door contact 22 input — output — alarm 23 — input — output — slip-ring 6 — flat spring 5 — pins 4 — ignition key 1 — and the latter conducts the current to ground. It is thereby completely immaterial in which position the key finds itself within the steering lock.

Figure 3:
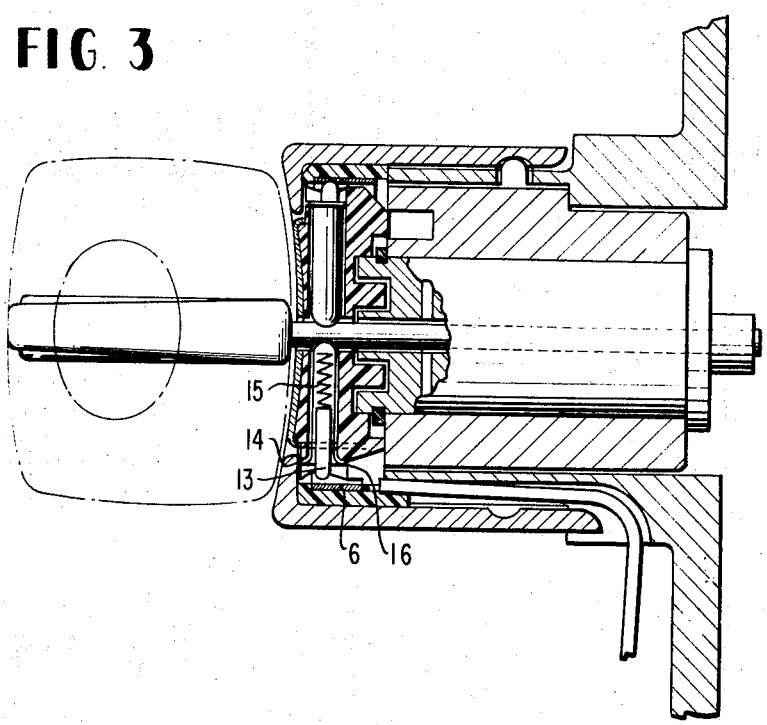
FIG. 3 is a longitudinal cross-sectional view, similar to FIG. 1, of a modified embodiment of a steering lock in accordance with the present invention with two telescopic pins.

In FIG. 3 the pins are constructed as telescopic pins which include each an inner pin part 13 and an outer pin part 14. These parts 13 and 14 are pressed apart by a spring 15 disposed on the inside. The inner pin part 13 is thereby pressed against the slip-ring 6. The outer pin parts 14 are provided at the outer end with a flanged or beaded edge 16 as abutment.

Figure 5:
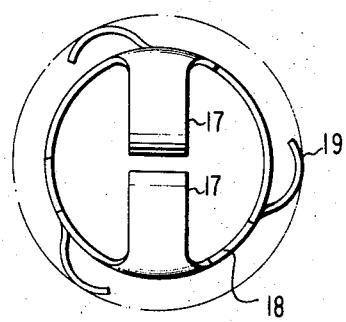
FIG. 5 is a plan view of the spring-ring according to FIG. 4.
Figure 4:
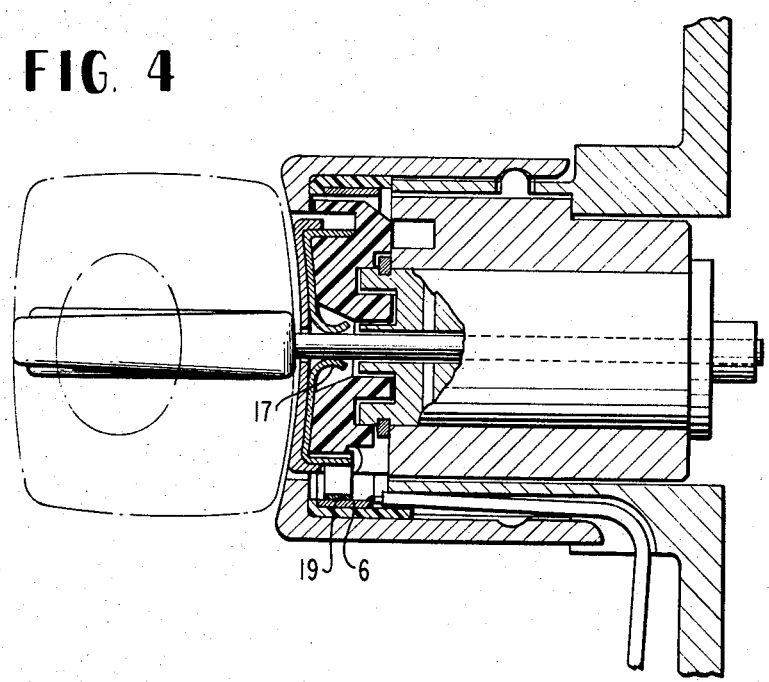
FIG. 4 is a longitudinal cross-sectional view, similar to FIGS. 1 and 3, through a still further modified embodiment of a steering lock in accordance with the present invention with spring-ring parts of a spring-ring projecting into the key path.

In the embodiment according to FIGS. 4 and 5, specially shaped spring-ring parts 17 are provided in the place of pins which belong to and form part of a ring 18, at the circumference of which are provided sliding springs 19 which establish the contact with the slip-ring 6. In FIG. 4 the form of the spring-ring parts 17 is illustrated with an inserted ignition key 1 having a shaft 1' of conductive material. FIG. 5 clearly illustrates the spring-ring parts 17 and the sliding springs 19 present at the circumference of the ring 18 which abut against the slip-ring 6.

The advantage results from the construction according to the present invention that the position of the ignition key is completely immaterial for the contact-making in order to trigger the warning installation during the opening of the door. Also, with a partly pulled-out ignition key, the contact with the ground remains preserved or maintained at the pins or at the spring-ring parts.

Furthermore, the present invention offers the advantage that the contact-making for the warning installation can be accommodated in a common housing together with the steering lock. The novel installation may be additionally and subsequently built into already-present steering locks. The manufacture of the installation is very simple so that that aimed-at safety mechanism can be manufactured very inexpensively.

While we have shown and described only several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A warning device for automotive vehicles comprising an electrically actuable alarm means disposed in a circuit, vehicle door actuated switch means in said circuit such that said switch means is closed when a vehicle door is open, a current source connected to said circuit, said circuit terminating in a steering lock assembly having ignition key receiving means, said lock assembly including insulation means for operably insulating said circuit with respect to ground when said key receiving means is empty, and a removable ignition key having conducting means for connecting said circuit to ground upon insertion into said receiving means, said conducting means and said key receiving means being configured for connecting said circuit to ground for all positions of said key within said receiving means, whereby the alarm is actuated whenever said vehicle door is open and said key is in said receiving means.

2. A warning device according to claim 1, wherein said lock assembly includes slip ring means electrically connected at all times to said circuit and spring biased contact-making means protruding into said key receiving means for engagement with said key, said contact-making means being arranged to form a conductive path between said slip ring means and said key when said key is in said key receiving means, and wherein said key includes conductive material for conducting current from said contact-making means to portions of the lock assembly which are connected to ground.

3. A warning device according to claim 2, wherein said key receiving means is a slot extending through a substantially cylindrical block of insulating material and said contact-making means are pins extending radially through said block, said pins having inner ends for engaging said key and outer ends conductively connected to said slip ring means.

4. A warning device according to claim 3, wherein each of said pins include two telescoping parts with a spring means therebetween for biasing said parts away from one another, the outer ends of said pins directly contacting said slip ring means.

5. A warning device according to claim 3, wherein each of said pins is a unitary part, the outer ends of said pins being in direct contact with a flat spring which biases the pins inwardly toward the key receiving means, said flat spring being in direct electrical contact with said slip ring means at all times.

6. A warning device according to claim 2, wherein said contact-making means is a single unitary spring member having portions in contact with said slip ring means at all times.

7. A warning device according to claim 2, wherein said slip ring means is embedded in an insulating ring of an outer cover cap covering the locking assembly.

8. A warning device according to claim 2, wherein said contact-making means are provided with abutment means for limiting the movement of said contact-making means in the direction of the key receiving means.

9. A warning device according to claim 5, wherein said block of insulating material includes an entrainment abutment for rotatably carrying said flat spring therewith upon rotation of the key.

* * * * *